United States Patent [19]

Kruska et al.

[11] 4,219,910
[45] Sep. 2, 1980

[54] CLAMPING DEVICE FOR SHEET MATERIALS

[75] Inventors: Lothar H. Kruska, Stamford, Conn.; Friedrich Hanstein, Gross-Zimmern, Fed. Rep. of Germany; Haven T. Owen, Cheshire, Conn.

[73] Assignee: American Cyanamid Company, Stamford, Conn.

[21] Appl. No.: 1,569

[22] Filed: Jan. 5, 1979

[51] Int. Cl.² ............................................. H44B 21/00
[52] U.S. Cl. ................................. 24/263 SB; 24/67.3; 24/263 B
[58] Field of Search ........ 24/263 SB, 263 SW, 263 B, 24/244, 67.3, 67.5; 248/316 E, 316 F, 452; 211/89

[56] References Cited

U.S. PATENT DOCUMENTS

| | | | |
|---|---|---|---|
| 2,316,290 | 4/1943 | Schenbeck | 24/263 SB |
| 3,120,281 | 2/1964 | Peveler et al. | 24/263 B UX |
| 3,336,642 | 8/1967 | Armacost | 24/263 B |
| 3,399,429 | 9/1968 | Goodman | 24/244 X |
| 3,675,782 | 7/1972 | Dudley | 24/244 X |
| 4,039,134 | 8/1977 | Redmer | 248/316 F X |

*Primary Examiner*—Philip C. Kannan
*Attorney, Agent, or Firm*—Paul W. Leuzzi

[57] ABSTRACT

A clamping device designed to securely hold sheet materials of varying thicknesses uniformly in a vertical manner.

3 Claims, 5 Drawing Figures

CLAMPING DEVICE FOR SHEET MATERIALS

BACKGROUND

This invention relates generally to a clamping device and, more particularly, to a clamping device designed to uniformly hold sheets of varying thicknesses in a vertical position.

Sheet materials, such as plastics, wood and metals, are frequently placed within ovens for uniform drying or heating operations. For various operation-oriented reasons, it often becomes necessary to hold these sheets in a vertical position during their residency within the ovens. To facilitate this vertical positioning, clamps, vices, and racks of varying designs have been employed.

The plastic thermoforming operation is a typical example of heating a sheet material in an oven. Typically, the plastic sheet is heated to a temperature between 150° C. to 200° C. before the molding fabrication. To avoid unwanted sheet irregularities it is generally preferred that these sheets be suspended in a vertical position during the heating operation. Various clamps, vices or racks have been employed to facilitate this suspension. Gravitational pull upon the sheet during suspension can, however, produce irregularities in the area where the sheet is being held in the vertical position likewise, if the sheet is placed within a rack, the sheet may bend or fold under its own weight as the plastic softens from the elevated temperatures. To overcome these problems, a clamping device wherein the sheet can be held uniformly becomes necessary. Such a clamping device would evenly distribute the draw upon the sheet and thereby produce a more uniform sheet.

Although various auxiliary air or hydraulic assist systems exist to combat this problem, there nevertheless exists a need for less expensive devices wherein a single operator can rapidly clamp or release sheets of varying thicknesses for vertical suspension in oven systems. The provision for such a clamping system would satisfy a long-felt need and constitute a significant advance in the art.

SUMMARY OF THE INVENTION

The present invention provides a clamping device for sheet materials such as plastics, wood and metals of various thicknesses. The clamping device comprises a stationary frame which may be made from steel, aluminum, or some other metal. The sheet material is held between the stationary frame and a clamping rod by a compression means, such as a spring. The compression means is such as to allow a plurality of sheet thickness to be held without any need for adjusting the clamping device. A plurality of slidably movable pistons attached to the clamping rod and projecting out through a plurality of openings in the stationary frame are activated by a releasing means, such as cam activated device, to counteract the compression means and thereby release the sheet being held. The clamping rod is of sufficient length so as to uniformly clamp the sheet along the entire length of the end being held. The releasing means is designed in such a manner as to allow a single operator to rapidly release the sheet being held.

DETAILED DESCRIPTION

Figure 1:
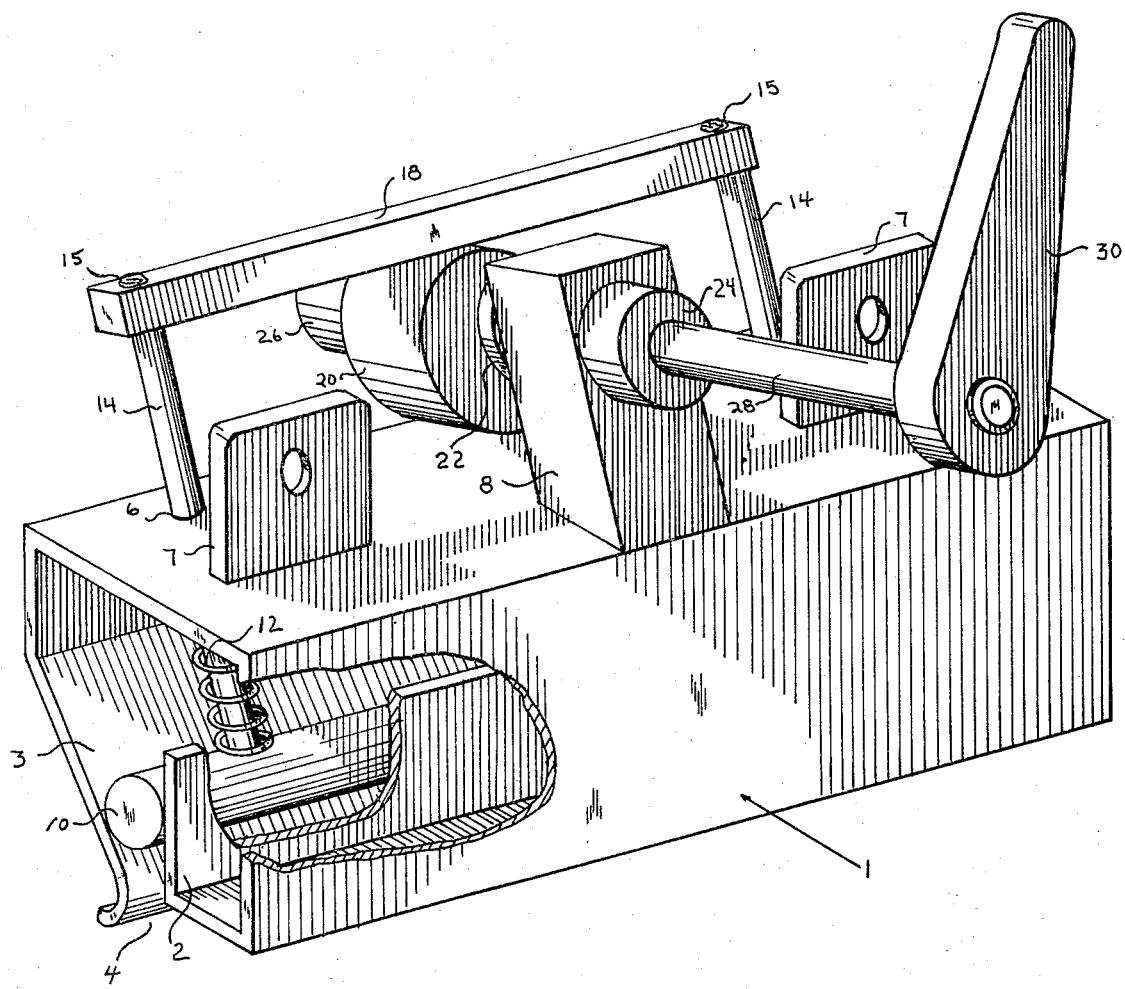
FIG. 1 is a perspective view of a clamping device in accordance with the present invention.

Referring now to the drawings, and to FIG. 1 in particular, the reference character 1 generally indicates the stationary frame of the clamping device. This stationary frame 1 can be made of any sufficiently rigid material which is resistant to temperatures in the range of 150° to 200° C., preferably a metallic material such as steel, aluminum or the like. The configuration of this stationary frame 1 is roughly that of a box having a portion of its bottom turned upward at a right angle to form the sheet rest 2 and having a portion of the side facing the sheet rest 2 on an inward slant such as to form the slanted wall 3. The gap 4, best seen in FIGS. 2 and 3, between the sheet rest 2 and the slanted wall 3 should be such as to accommodate the thickness of the varying sheet materials the clamping device of the present invention is intended to hold in position. Portions of the slanted wall 3 may be cut out to allow for the release of heat buildup, thereby imparting an even distribution of heat on the clamped sheet. Attached approximately in the center along the length on the top of the stationary frame is a support 8 which supports the releasing means of the clamping device. Positioned on each side of the support 8 on the top side of the stationary frame are suspension supports 7. The suspension supports 7 enable the clamping device to be suspended in mid air so that the sheet material being held is thereby free of all contact during the processing steps. Also located on each side of the support 8 are holes 6 in the top of the stationary frame 1. The holes 6 provide a passage through which the pistons 14 slidably move in relation to the stationary frame 1. The length of the stationary frame 1 should be made to accommodate the varying sheet materials intended to be held. As the length increases it is preferred to provide more than a single set of suspension supports 7 and holes 6 in the stationary frame. The additional suspension supports 7 will provide increased stability to the device and allow for a more level position to be maintained in its mid air suspension. Likewise, the increased number of holes 6 through which additional pistons 14 can slidably pass will enable a more uniform releasing of the sheet material when the sheet size is increased.

Figure 2:
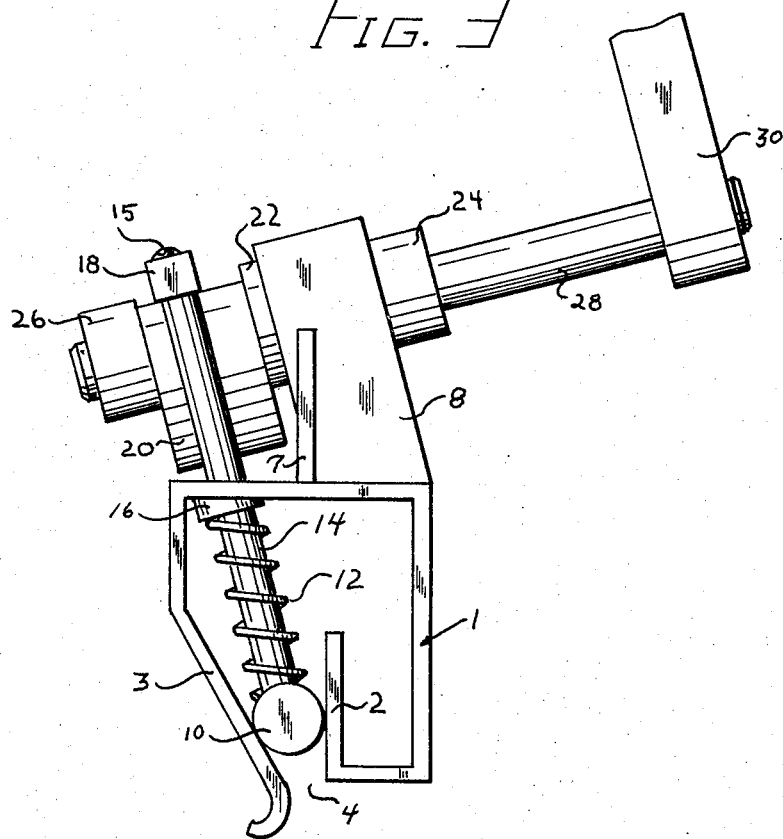
FIG. 2 is a vertical cross-sectional view of the clamping device in its closed position.

FIG. 2 illustrates the relative positioning of the clamping rod 10 to the sheet rest 2 when the clamping device is in a clamping position. The clamping action is the result of a compression means of suitable strength, in this instance a spring 12, forcing the clamping rod 10 against the sheet rest 2 along its length. The spring 12 in this instance is circumferentially positioned around piston 14. A seat 16 may be placed over the hole 6 on the inside of the stationary frame 1 so as to engage the spring 12 in a perpendicular manner in an effort to avoid unwanted biasing of the spring 12 against the piston 14. The sheet material will be securely held between clamping rod 10 and sheet rest 2 with the sheet rest 2 maintaining the sheet material in a vertical position. Additionally, a plurality "O" rings of any suitable synthetic material may be spaced along clamping rod 10 for increasing the clampability of textured sheets.

Figure 3:
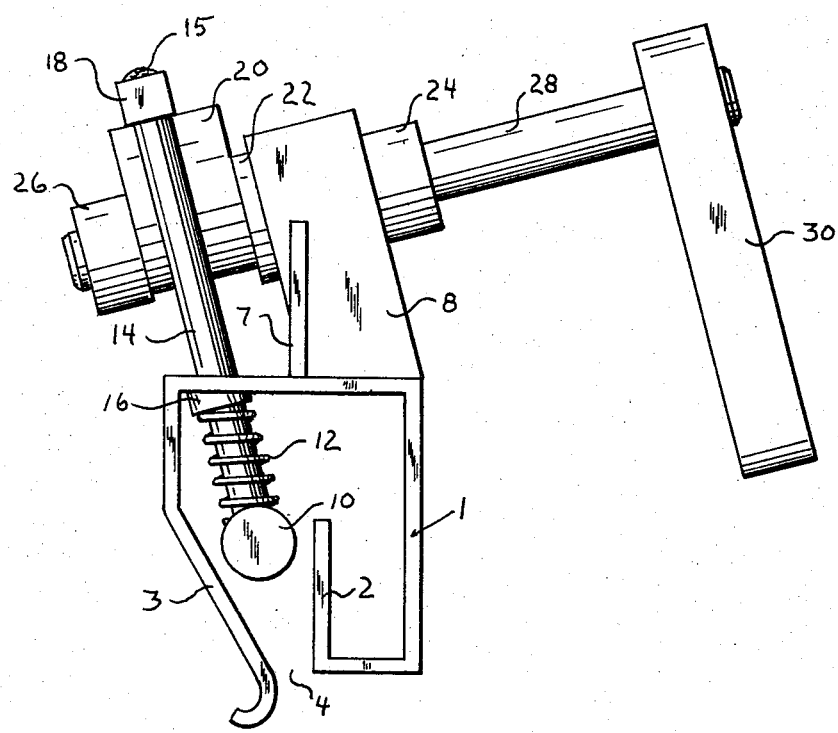
FIG. 3 is a vertical cross-sectional view of the clamping device in its open position.

FIG. 3 illustrates the clamping device in its released position. By the simple movement of the handle 30 attached to the arm 28 of the clamping device, a releasing means, in this instance a cam 20, actuates the pistons 14 in the upward motion to counteract the compression of the spring 12. The arm 28 is mounted on the clamping device through support 8 and is correctly positioned by support collars 24 and 26. A buffering ring 22 prevents the cam 20 from chafing against the support 8, and is preferably made of bronze or some synthetic material resistant to heat. The movement of the cam 20 engages the piston connecting rod 18, pushing the rod in an upward direction. In that the piston connecting rod 18 is secured to the top of the pistons 14 by any suitable means, in this instance screws 15, this upward movement of the piston connecting rod 18 is translated to the pistons 14, thus counteracting the compression means 12 which is acting to force rod 10 into contact with sheet rest 2 to clamp the sheet material between the clamping rod 10 and the sheet rest 2.

Figure 4:
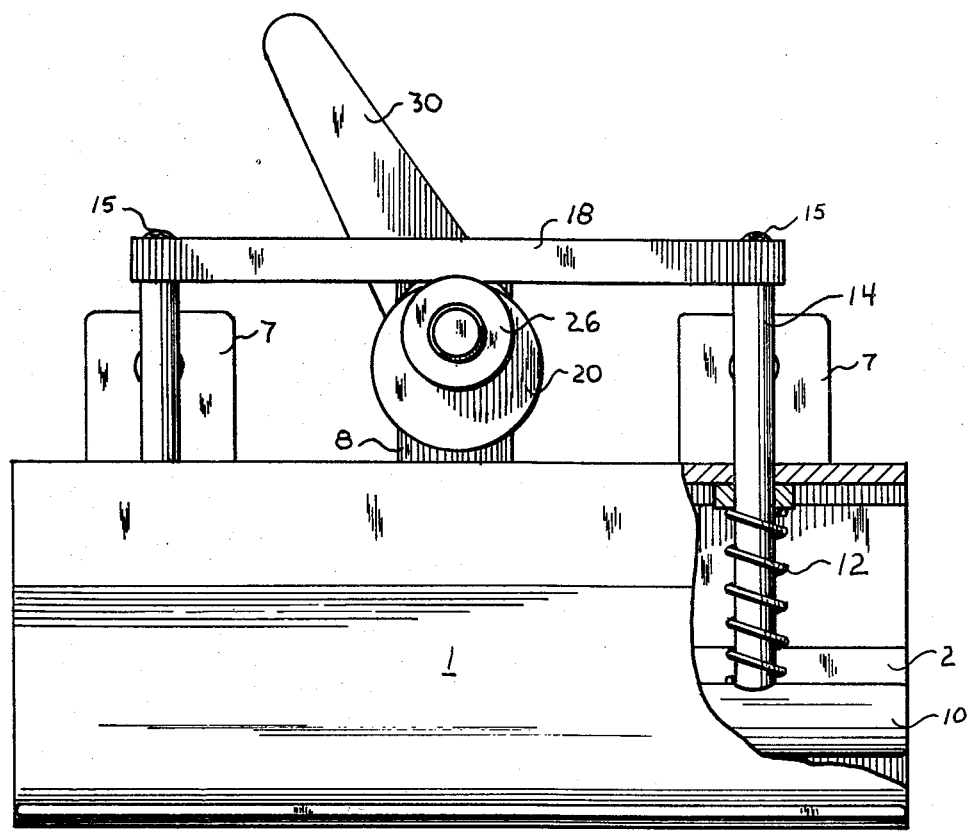
FIG. 4 is a horizontal cross-sectional view of the clamping device.

FIG. 4 illustrates the clamping device from a horizontal, cross-sectional view with a section cut away to enable viewing of the relative positioning inside the stationary frame 1. In this illustration, the clamping device is again in a clamping position. The clamping rod 10 is biased against the sheet rest 2 by the action of the spring 12. To release the clamping device, the handle 30 is moved 180° so that the cam 20 can engage the piston connecting bar 16 in an upward manner thereby slidably moving the pistons 14 attached to the clamping bar 10 upward and away from the sheet rest 2 in a motion that counteracts the compression upon the clamping bar 10 imparted by the spring 12.

Figure 5:
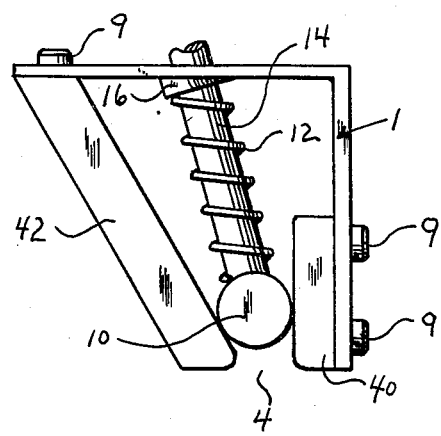
FIG. 5 is a vertical cross-sectional view of an alternative stationary frame.

FIG. 5 illustrates an alternative configuration for the stationary frame 1. In this embodiment, the stationary frame 1 takes on the configuration of an inverted right angle. In place of the sheet rest 2 there is substituted a thick metal bar 40 attached to a wall of the stationary frame 1 by bolts 9. The slanted wall 3 of the stationary frame 1 has been replaced by a thick metal wall 42 capable of being attached to the stationary frame by bolts 9. Again, the gap 4 should be such as to accommodate the thicknesses of the varying sheet materials the clamping device is intended to hold in position. This embodiment allows for a more simplified construction of the stationary frame 1, no longer necessitating extensive bending, welding or extruding to arrive at the proper configuration. Additionally, this configuration allows for the gap 4 to be varied simply be replacing the metal bar 40 with metal bars of varying thickness.

The present invention may be embodied in other specific forms without departing from the spirit or essential attributes thereof and, accordingly, reference should be made to the appended claims, rather than to the foregoing specification as indicating the scope of the invention.

We claim:

1. A clamping device for use during thermoforming operations which is resistant to temperatures in the range of 150° to 200° C. comprising in combination:
   (a) stationary frame;
   (b) a clamping rod located within said stationary frame, said clamping rod being of sufficient length so as to uniformly hold clamped objects;
   (c) a compression means located within said frame such as to compress said clamping rod against said stationary frame, said compression means being a plurality of springs sufficiently biased to maintain clamped objects in a vertical position;
   (d) a plurality of slidably movable pistons attached at one end to said clamping rod and projecting out through a plurality of openings in said stationary frame;
   (e) a releasing means engaging said plurality of slidably movable pistons such as to counteract said compression means.

2. The clamping device of claim 1 wherein said compression means is a plurality of springs circumferentially positioned around said pistons.

3. The clamping device of claim 1 wherein said releasing means is a cam activated device, said cam disposing a bar connecting said pistons in such a manner as to counteract the compression means.

* * * * *

UNITED STATES PATENT OFFICE
CERTIFICATE OF CORRECTION

Patent No. 4,219,910      Dated September 2, 1980

Inventor(s) Lothar Herbert Kruska, Friedrich Hanstein and Haven Trask Owen

It is certified that error appears in the above-identified patent and that said Letters Patent are hereby corrected as shown below:

On the title page, after Assignee, please delete

"American Cyanamid Company" and insert therefor

-- CY/RO Industries --.

Signed and Sealed this

*Eighteenth* Day of *November 1980*

[SEAL]

*Attest:*

*Attesting Officer*

SIDNEY A. DIAMOND

*Commissioner of Patents and Trademarks*